United States Patent [19]

Campbell

[11] Patent Number: 4,724,290
[45] Date of Patent: Feb. 9, 1988

[54] MICROWAVE POPCORN POPPER

[76] Inventor: Mason M. Campbell, 115 Reagan St., Pineville, La. 71360

[21] Appl. No.: 790,770

[22] Filed: Oct. 23, 1985

Related U.S. Application Data

[63] Continuation of Ser. No. 603,570, Apr. 25, 1984, abandoned.

[51] Int. Cl.$^4$ .............................................. H05B 6/80
[52] U.S. Cl. ..................... 219/10.55 E; 219/10.55 F; 219/10.55 M; 99/DIG. 14; 99/323.7; 99/323.8; 426/243
[58] Field of Search ................. 219/10.55 M, 10.55 E, 219/10.55 P, 10.55 F, 10.55 D; 99/DIG. 14, 451, 323.5, 323.6, 323.7, 323.8, 323.9; 426/107, 241, 243

[56] References Cited

U.S. PATENT DOCUMENTS

| | | | |
|---|---|---|---|
| 3,461,260 | 8/1969 | Bremer | 219/10.55 F |
| 4,104,957 | 8/1978 | Freedman et al. | 219/10.55 E X |
| 4,144,435 | 3/1979 | Clark et al. | 219/10.55 E |
| 4,166,208 | 8/1979 | Martel et al. | 219/10.55 E |
| 4,210,674 | 7/1980 | Mitchell | 426/107 |
| 4,381,696 | 5/1983 | Koral | 219/10.55 E X |
| 4,386,109 | 5/1983 | Bowen et al. | 219/10.55 E X |
| 4,477,708 | 10/1984 | Danley et al. | 219/10.55 E |
| 4,496,816 | 1/1985 | McNamara | 219/10.55 E |

Primary Examiner—Philip H. Leung
Attorney, Agent, or Firm—Mason M. Campbell

[57] ABSTRACT

A popcorn popper for popping unpopped corn in a microwave oven having a cavity therein and producing a source of microwave energy, comprising a popping section transparent to microwaves for popping an amount of unpopped corn; a containment portion included with the popping section for preventing an amount of popped corn, as the unpopped corn pops and becomes an amount of popped corn, from leaving the popping section and falling into the cavity of the microwave oven; and an at least partially microwave opaque section having an opening therein in open communication with the popping section for receiving the popped corn. A member included with the popping section and positioned angularly to the horizontal plane urges the popped corn into the at least partially microwave opaque section. Apparatus for supplying a liquid such as a flavoring or melted butter which may be used with the popper or other devices, provides melted butter to the popped corn after a time delay.

27 Claims, 8 Drawing Figures

MICROWAVE POPCORN POPPER

This is a continuation of application Ser. No. 603,570, filed Apr. 25, 1984, now abandoned.

BACKGROUND OF INVENTION

1. Field of Invention

The present invention relates to microwave containers for popping popcorn. More particularly, the present invention relates to microwave containers for popping popcorn which comprise a microwave transparent container for cooking or popping the corn and an attached essentially microwave opaque container for containing the popped corn and preventing the popped corn from burning.

2. Prior Art

It is known that microwaves are a form of electrical energy that are similar to radio waves. These waves are disseminated within a microwave cavity in a random fashion. They bounce off the walls of the cavity, usually numbering six (counting the walls and the top and the bottom), and the energy is radiated onto, and reflected off the walls of the cavity. Liquids generally react to microwaves more than solids do as the molecules are easier to move, generally due to the amorphous nature of the liquids. Foods consist primarily of some type of liquid or moisture, and on a cellular level, organic foods can consist of as much as 80% water or more. Even popcorn contains its amount of water.

Although the microwave spectrum may be considered to extend from about 0.3 to 300 gigahertz, with the corresponding wave lengths being from one meter to one millimeter, microwave radiation will usually be in the range of 0.3 to 50 gigahertz, and as a practical matter, in the United States, will be within the range of 0.8 to 3 gigahertz (wavelengths of 0.375 to 0.10 meters respectively) because of the uses of the 0.915 and 2.45 gigahertz bands (wavelengths of 0.328 meters to 0.122 meters respectively). It is to be noted that as the frequency increases the wavelength decreases.

Widely stated, microwaves have a typical wavelength of 100 centimeters to 0.1 centimeters (correspondingly the frequencies are 0.3 gigahertz and 300 gigahertz respectively as stated above), and the microwaves are preferably at a frequency of 2450 megahertz, which is the frequency reserved for industrial, scientific, and medical uses of the shorter radio waves. The frequency of 2450 megahertz corresponds to a wavelength of approximately 12 centimeters.

Materials such as plastics and ceramics are known to be transparent to microwave radiation, and materials such as stainless steel and silver are opaque to microwaves as they are conductors and microwaves, by the nature of their high alternating frequency remain on the surface of these materials and do not penetrate, and hence are "opaque" to this form of radiation.

Pillsbury, Orville Redenbacher, and others have marketed packaged popcorn for microwaves in which the popcorn, oil, and seasoning are in a sealed bag and the sealed bag is placed in a microwave oven for popping. The bag, although transparent to microwaves, is opaque to light and hence to viewing and it is difficult to tell when the popping process is finished, resulting in a more than occasional burning of the popcorn, and in other occasions excessive unpopped corn.

Other available microwave transparent containers for popping popcorn, such as Anchor Ovenware's Microware Popcorn Popper, possess no preferential microwave opaque section or container, and rely on the sound of popping (or actually the lack of it) to notify the user that the popping process is finished, or the user must visually note, if the container is transparent to light, that the popping is finished.

Another problem which makes it difficult to tell when the popping is finished, lies in the nature of where to place the item such as popcorn to be popped for consistent results, especially when relying on timing mechanisms. The random nature of the radiation, and the slight difference in placement making consistent timing difficult, what takes 4 minutes one time, takes 5 minutes the next, an increase or difference of 25% in cooking time, hence attempts at using timers results in more than occasional under popping of the corn or burning of the corn.

Robert L. Klamm and Maurice R. Day (U.S. Pat. No. 4,055,252 issued on Oct. 25, 1977) disclose a "Container Liquid Level Detector Apparatus". The disclosure states that a conductive material, such as liquid in a glass container C, will decrease the microwave signal level which passes through the glass container C in proportion to the quantity of such liquid (conductive material) present, and that the received signal is amplified through a variable high gain A.C. amplifier in order to accommodate variations in gain of transmitting and receiving units. This allows the rejection system embodied in the inspection means to reject the container C which has an excessive residual or unacceptable quantity of liquid and remove it from the assembly line. The frequency used for the microwave transmitter is 10.525 gigahertz. The received signal strength is affected by the dielectric constant of the material or media between the sensors, the dielectric constant of water being approximately 80 compared to that of 2.5 for glass.

Marvin L. Bright, Jr. (U.S. Pat. No. 4,188,769 issued on Feb. 19, 1980) disclosed a process for sealing a container formed from a polymer such as homopolymers, copolymers, and terpolymers, the apparatus of which comprises a source of microwave energy 1 such as a magnetron, and a rectangular waveguide 3 which has an opening 5 therein for the insertion of the container end portion to be sealed. With this disclosed method, the waveguide 3 retains the radiation within the guide 3 and the articles 11 remain outside the microwave field, contained by the container 9 and protected by the waveguide 3.

John J. Austin (U.S. Pat. No. 4,248,901 issued on Feb. 3, 1981) disclosed a "Combination Package and Sleeve Support Means" that comprises of two containers housing an expandable food product which are placed in face-to-face juxtaposition; and a sleeve complemental in shape to the exterior panels of the facing containers which is wrapped around the containers to form a unitized package. The sleeve is bisected by a perforated score line which enables the sleeve to be separated into two pieces. This embodiment is described in the disclosure as being suitable for containing corn kernels and cooking oil for forming popcorn. The embodiment includes an expandable polyethylene liner and is disposable after use. With this type of embodiment, it is impossible to observe the corn popping as the container housing is made of paperboard or a paperboard lamination and thus opaque to popcorn viewing, and as such difficult to discern when the popping process is finished and thus avoid burning the popped corn, and in no way does the disclosed embodiment cooperate with the microwave environment, other than that of it being transparent to microwaves. The disclosure also notes that the embodiments have no metallic elements or components which absorb microwave energy and heat.

Another patent of John J. Austin (U.S. Pat. No. 4,304,327 issued on Dec. 8, 1981) which was copending to his U.S. Pat. No. 4,248,901 discloses a "Container Unitizer Sleeve and Support" which are used to retain the afore mentioned containers in the face-to-face relationship. Again the disclosure notes that the embodiments have no metallic elements or components which absorb microwave energy and heat.

Melvin L. Levinson (U.S. Pat. No. 3,985,991 issued on Oct. 12, 1976) disclosed a method of using a microwave-reflective, heat conductive food container contained within a microwave permeable, non-lossy, heat-insulating, porous body wherein said body is so disposed as to absorb and disperse lossy liquid which evaporates from a cooking foodstuff and condenses on the reverse side of the food container when a frozen foodstuff, in direct thermal contact with the obverse side of the food container, cools the reverse side below its dew point. With this method at least one side of the opaque heat-conductive food container must be transparent to microwaves and the container base 3 is constructed of a microwave-permeable, porous material which absorbs condensed liquid, as the capillary action of a blotter, from surface contact with the reverse surface of the foil and transports the received liquid to a location exposed to microwave energy wherein the liquid is vaporized and recycled within the heating chamber 5. The method as disclosed is primarily for defrosting and heating frozen convenience food packaged on aluminum foil trays in paper containers.

Peter N. Stevenson (U.S. Pat. No. 3,615,713 issued on Oct. 26, 1971) disclosed a cooking utensil set for various foodstuffs that constitute a meal and are each contained in separate containers for the purpose of cooking the foodstuffs in a microwave oven. The patent discloses that individual containers are constructed so that different degrees of radiation occur to the foodstuffs contained therein, thereby allowing the cooking of a complete meal at one time. The cooking utensil set discloses utilizing suitable opaque materials such as copper, steel, or other metals for the individual containers to control the rate of cooking so that all the individual items are brought up to temperature simultaneously and illustrates the use of aluminum foil covered by a cardboard or plastic warpper as a suitable opaque material. The rate of cooking is disclosed as being controlled by having holes or openings 12 placed in them to allow selected amounts of radiation to penetrate the package and bring the material within up to the desired temperature, and that the number and size of holes is determined according to the normal serving temperature of the material within, the electrical characteristics of the material within, and the time the material is in the oven. Other disclosed embodiments for controlling the rate of cooking are disclosed as controlling the amount of reflective or opaque material per unit volume of solvent or suspension that is sprayed or deposited on the individual packages; fabricating the container of a reflective material that can be scored or etched to provide the desired irradiation; and controlling the thickness of the reflective or opaque material that is used to surround the package, very thin layers of essentially reflective material actually transmitting or allowing to penetrate small amounts of radiation, the amount of penetration being a function of the thickness of the material. This disclosure makes no mention of the benefits nor anticipates having an item such as popcorn cooked in a transparent medium and than have the popped corn transferred by means such as gravity to a microwave opaque container to prevent the popped corn from continued heating and eventual burning as the unpopped corn continues to pop. The disclosure also states that the enclosed items are continuously enclosed in the opaque materials from the time before they are placed in the microwave oven, during the microwave cooking process, and are only removed from the opaque material after the complete cooking process is over and after the cooking utensil set is removed from the microwave oven. The set as also disclosed is transient and disposable in nature.

Additional prior patents which may be of interest are listed below:

| Patent No. | Patentee(s) | Issue Date |
|---|---|---|
| 3,716,606 | Patrick S. Bazett | February 13, 1973 |
| 4,183,435 | Thompson et al. | January 15, 1980 |
| 4,184,601 | Stewart et al. | January 22, 1980 |
| 4,205,114 | Canterino et al. | May 27, 1980 |
| 4,225,531 | Harold A. Arbit | March 10, 1981 |
| 4,256,944 | Deryck Brandon | March 17, 1981 |
| 4,281,083 | Harold A. Arbit | July 28, 1981 |
| 4,286,136 | Stanley I. Mason, Jr. | August 25, 1981 |
| 4,294,858 | Rex E. Moule | October 13, 1981 |
| 4,315,573 | Bradley et al. | February 16, 1982 |
| 4,327,136 | Thompson et al. | April 27, 1982 |
| 4,347,216 | Kawasaki et al. | August 31, 1982 |
| 4,348,572 | Rex E. Moule | September 7, 1982 |
| 4,353,890 | George V. Scott | October 12, 1982 |
| 4,387,012 | Harold A. Arbit | June 7, 1983 |
| 4,391,833 | Self et al. | July 5, 1983 |
| 4,404,241 | Mueller et al. | September 13, 1983 |
| (PCT) WO 80/02902 | White et al. | December 24, 1980 |

3. General Discussion of the Invention

A popcorn popper for popping popcorn in a microwave oven comprising a popping section transparent to microwaves for popping the kernels of unpopped popcorn; and an essentially microwave opaque section or container located below the popping section and having at least one opening for receiving the popped corn. The essentially microwave opaque section receiving the kernels of popped corn as they fall through the opening(s), storing the popped corn and preventing the kernels of popped corn from burning as the kernels of unpopped corn continue to pop.

The popping section comprises a means for holding the kernels of unpopped corn until they are popped by the microwaves and includes a preferential clear containment means which surrounds the means for holding the kernels of unpopped corn. The preferential clear containment means permitting visual observance of the popping process while preventing the kernels of popped corn as they pop from leaving the containment of the popper and falling into the cavity of the microwave oven.

The essentially microwave opaque section need only be made from a material which only needs to reflect or absorb sufficient amounts of microwave radiation to prevent the burning of the popped corn received by the essentially microwave opaque section during the remainder of the popping process. The material can range from a material such as stainless steel which is very opaque to microwaves, to a combination of materials selected for their combination of reflection and absorption of microwaves.

The opening(s) into the essentially microwave opaque section preventing essentially the entrance of microwaves having a wavelength longer than the width or measurement of the opening. An exemplary width or measurement of 2 centimeters preventing the entrance of microwaves having a frequency equal to or less than 15 gigahertz.

The invention also includes an automatic buttering device which supplies melted butter to the kernels of popped corn and which is intended for use in a microwave oven or the like environment. The buttering device has a timing means for allowing the melted butter or margarine or the like to be automatically delivered at the end of a time delay period to the kernels of popped corn. The timing means includes a time delay means and preferably a manually adjusting means to allow the user to control and select the length of the time delay period before the melted butter is supplied to the popped kernels of corn. This allows the user to best control the supply of melted butter, allowing the melted butter to be delivered to a substantial amount of popped corn, and not prematurely to an empty container or a container containing only substantially small amounts of popped corn.

It is an object of the present invention to present a popcorn popper for use in a microwave oven or the like environment which has a popping section transparent to microwaves and an essentially microwave opaque section for receiving and storing the kernels of popped corn until at least the popping process is finished, the essentially microwave opaque section reflecting or absorbing enough microwave radiation to prevent the burning of the popped corn.

It is a further object of the present invention to present a popcorn popper for use in a microwave oven or the like environment which allows to the user at least three methods of timing the popping process: (1) the use of the built in microwave timer or other timing means; (2) audible by the lack of popping sound indicating the popping process is finished; and (3) visual by observing through the clear containment means that the popcorn has ceased to pop.

It is an even further object of the present invention to present an automatic buttering device for supplying melted butter to the kernels of popped corn which is intended for use in a microwave oven or the like environment, the buttering device having a timing means for allowing the supply of melted butter or margarine or the like to be automatically delivered at the end of a time delay period to the kernels of popped corn, allowing the user to best control the supply of melted butter and allow the melted butter to be delivered to a substantial amount of popped corn, and not prematurely to an empty container or a container containing only very small amounts of popped corn.

BRIEF DESCRIPTION OF THE DRAWINGS

For a further understanding of the nature and objects of the present invention, reference should be had to the following detailed description, taken in conjunction with the accompanying drawings in which like parts are given like reference numerals and wherein.

DETAILED DESCRIPTION OF THE PREFERRED EXEMPLARY EMBODIMENT(S)

Figure 1:
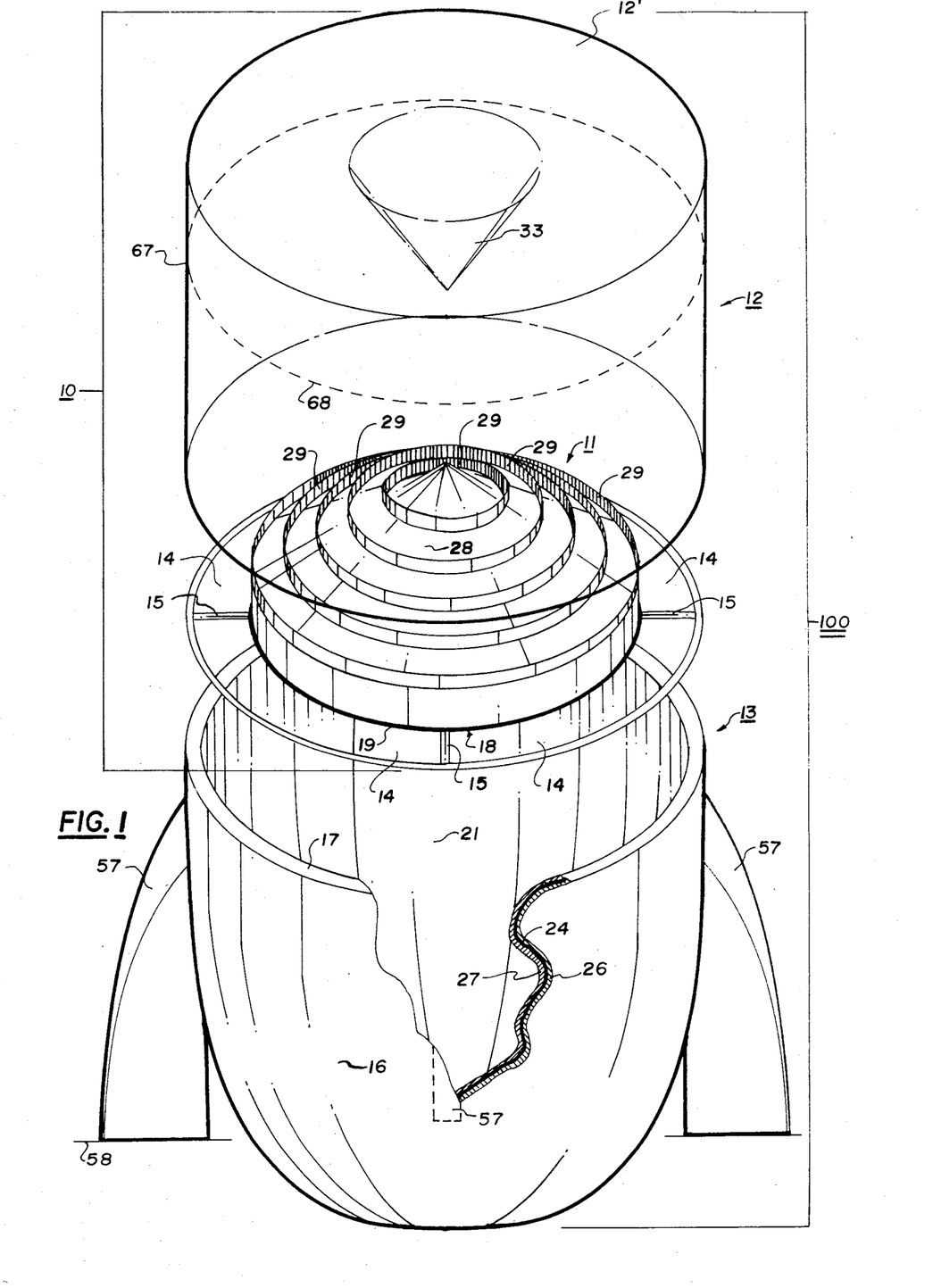
FIG. 1 is an exploded perspective view of a preferred exemplary embodiment of the popcorn popper of the present invention with the exemplary wall of the exemplary bowl of the essentially opaque section shown cut away.

In FIG. 1 an exemplary preferred embodiment of the present invention of a microwave popcorn popper 100 is seen. The exemplary popper 100 comprises a popping section 10 which is transparent to microwaves for popping the corn, the popping section 10 having a means 11 for holding the popcorn to be popped, and a containment means 12 located around the means 11 for holding the popcorn to be popped. The containment means 12 surrounds the popping area of the popper 100 and prevents the popped corn as it pops from leaving the popper and falling into the cavity of the microwave oven. The exemplary illustrated containment means 12 is configured as an inverted bowl having a topside and a continuous side connected to the topside along its upper edge to form the exemplary containment means 12. The containment means 12 which surrounds the popping area would preferentially be made of a clear material or other optically transparent material such as glass or a plastic suitable for microwave environment. The use of a clear containment means 12 allows the user full visibility in observing the popping process and allows the user by visual means to discontinue the popping process by turning the microwave oven off and remove the popper from the microwave oven as desired. The use of a clear or optically transparent containment means 12 thus affords to the user 3 methods of timing the popping process: (1) use of a built in microwave timer or other timing means; (2) audible by the lack of popping sound indicating the popping process is finished; and (3) visual by observing through the clear containment means 12 that the popcorn has ceased to pop.

Figure 2:
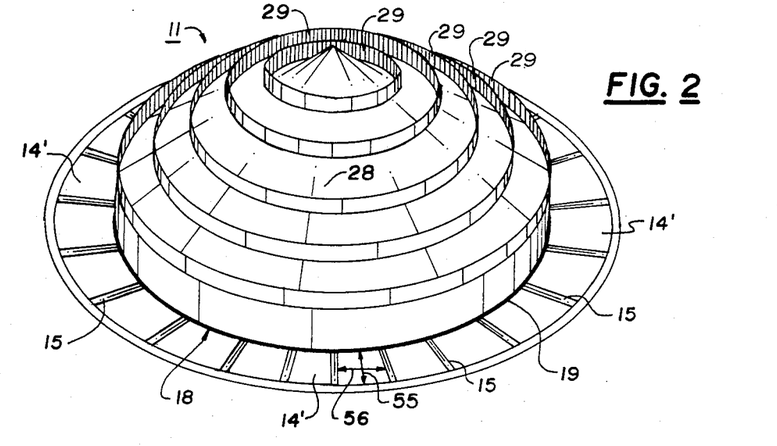
FIG. 2 is a perspective view of a preferred exemplary embodiment of the popping means of FIG. 1 in which the larger openings 14 are replaced with a series of smaller openings 14', separated by essentially microwave opaque ribs 15.

The popper 100 also comprises an essentially opaque section 13 attached to the popping section 10 for receiving the popped corn. The exemplary opaque section 13 is shown located below the popping section 10 and receives the popped corn through an exemplary circumferential opening 14 which surrounds the base of the popping section 10. The opaque section 13 receiving the popped corn and storing the popped corn until the popping process is finished, the essentially opaque section 13 preventing the popped corn from burning as the unpopped corn continues to pop in the popping section 10 and allows the unmonitored popping of the corn. An exemplary circumferential opening 14 has an exemplary width of 20 millimeters (2 centimeters) which prevents a large amount of the microwaves from entering the essentially opaque section 13 and burning the popped corn. An exemplary opening 14 can also be made as a preferable series of exemplary openings 14' as seen in FIG. 2, each having an exemplary width 55 of 20 millimeters and an exemplary length 56 of 20 millimeters or as a preferable series of circular openings each having an exemplary diameter of 20 millimeters, a plurality of exemplary ribs 15 which separate the individual exemplary openings being preferentially formed also from an essentially opaque material. These exemplary ribs 15 afford even greater protection as they cooperate with the openings 14', limiting the size of the openings 14' to even further limit the number of the microwaves which enter the essentially opaque section 13. These openings 14 and 14' can be made as small in width 55 and length 56 as the diameter of the largest kernel of popped corn expected and should include a small differential measurement to allow the popped corn to pass through the openings 14 or 14' without sticking in the opening. An exemplary opening 14' of 20 millimeters essentially preventing the entrance of microwaves having a wavelength greater than 2 centimeters, which corresponds to microwaves having a frequency equal to or less than 15 gigahertz.

Figure 4:
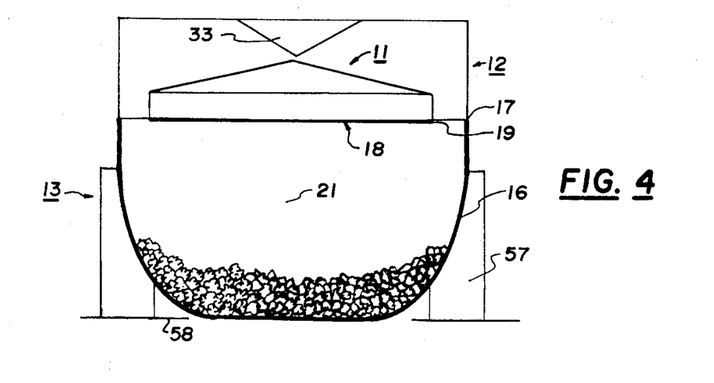
FIG. 4 is a schematic cut open view of the exemplary essentially opaque section 13 of the preferred exemplary embodiment of FIG. 1 showing the popped corn contained in the chamber 21 of the essentially microwave opaque bowl shaped section 16, the essentially microwave opaque top piece 18, and one of the essentially microwave opaque ribs 15.

The exemplary essentially microwave opaque section 13 of the exemplary popper 100 as seen in FIG. 1 and in schematic cross section in FIG. 4 is preferentially formed of an essentially opaque bowl shaped section 16 having an edge 17 extending around the bowl shaped section 16 for holding and retaining the popped corn until the popping process is finished. The exemplary essentially microwave opaque section 13 also includes an essentially opaque preferably disk shaped top piece 18 positioned above and located in the edge 17 of the bowl shaped section 16. The exemplary top piece 18 preferably formed integral as the bottom of means 11 for holding the popcorn to be popped and located a distance such as an exemplary one inch below the location of the means 11 for holding the popcorn to be popped. The top piece 18 and the bowl shaped section 16 having at least one opening 14 or 14' (FIG. 2) into the bowl shaped section 16, and the opening 14 or 14' (FIG. 2) is preferentially defined by the essentially opaque ribs 15 (FIGS. 1 and 2) as described above, the essentially opaque edge 17 of the bowl shaped section 16, the edge 19 of the top piece 18, and the ribs 15 defining the openings 14 or 14' (FIG. 2) and allowing the popped corn to enter the essentially opaque shaped section 16. The bowl shaped section 16 and the top piece 18 comprising a closed essentially opaque container, the only entrance into the container being the openings 14 and 14' (FIG. 2), the openings 14 or 14' (FIG. 2) preventing essentially the entrance of microwaves into the essentially microwave opaque section 13 which have a wavelength greater than the exemplary 2 centimeters. The exemplary top piece 11 along with its included essentially microwave opaque top piece 18 is preferably removable from the bowl shaped section 16 to allow easy access to and removal of the popped corn from the bowl shaped section 16. The exemplary embodiment as described with the top piece 18 and popping section 10 removed also allows the exemplary bowl shaped section 16 as disclosed and described to be used as a serving bowl for the popped corn.

Figure 3:
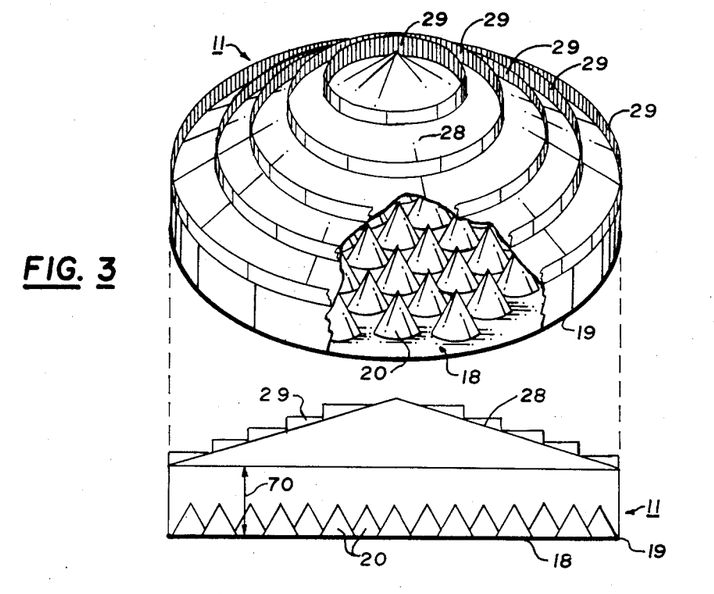
FIG. 3 is an exploded perspective and exploded side view of an exemplary essentially opaque top piece 18 of an alternate embodiment of the preferred exemplary embodiment of FIG. 1 shown formed with a pattern comprised of conical shaped sections 20 for reflecting the microwaves in a random manner to aid in complete popping of the popcorn.

As seen in FIG. 3, an exemplary essentially opaque top piece 18 is shown formed with at least one pattern which aids in reflecting the microwaves in a random manner to aid in complete popping of the popcorn. The exemplary pattern shown for reflecting the microwaves in a random manner is comprised of shapes such as conical shaped sections 20. Other unillustrated exemplary patterns for reflecting the microwaves in a random manner include pyramids and hemispheres. An exemplary height for the cones would be on the order of ¼ inch although other heights and patterns would also be within the scope of this concept.

The essentially opaque material used in forming the bowl shaped section 16, ribs 15, and top piece 18 as exemplified by FIGS. 1, 2, and 3, can be a metal such as stainless steel, aluminum, or other conductive material. The use of stainless steel, aluminum, or other highly conductive material forms a very reflective container for the microwaves. Other materials which are not nearly as reflective and have the capacity to absorb or reflect or limit in some way the penetration of microwaves into the opaque section 13 are within the scope of the invention and may also be used. Forming the walls 26,27 of the bowl 16 of a transparent to microwave material such as a plastic and as such from an exemplary member of the group of thermosetting plastics such as amines, allows the hollow 24 of the bowl 16 to be filled with a material which absorbs a sufficient amount of energy from the microwaves. Correspondingly, the top piece 18 can also be exemplary shaped to also have a material which absorbs a sufficient amount of microwaves to impede the passage of microwaves through the top piece 18 and limit the number of microwaves reaching the popped corn in a similar or analogous manner to the hollow walls 22 which are also filled with a microwave absorbing material.

An exemplary illustrated embodiment as seen in FIG. 1 which uses one of the high reflectance materials for the top piece 18 and the bowl 16 would have a preferentially thin layer of material such as for example a thin silvery coating 24 between an outer layer 26 of microwave transparent material such as plastic and an inner layer 27 of microwave transparent material such as plastic. The top piece could also be made in an unillustrated likewise manner, the high reflectance material interposed between an outer and an inner layer of microwave transparent material such as an exemplary plastic.

An exemplary high reflectance material such as stainless steel could have openings which allow a certain amount of microwave energy to enter the chamber 21 of the opaque section 13. Any combination of reflectance and energy absorption material which limits the penetration of the microwaves into the chamber 21 so as not to burn the popped corn while the popping process is continuing is sufficient, and any material that impedes their entrance sufficiently for the period of time necessary to pop the corn is also sufficient. The thinness of an exemplary reflective material such as aluminum or a silvery coating effectively regulating the penetration of microwaves into the chamber 21, the thinness of the material allowing the material to become semi-opaque and allowing only a regulated amount of microwaves to enter the chamber 21. The exemplary reflectance could be a combination that includes a thin silvery or metallic layer combining energy absorption properties and reflectance properties.

The exemplary material could take the form of exemplary metal flakes of aluminum, stainless steel, or other microwave opaque material suspended in the transparent to microwaves material such as exemplary plastic which forms the bowl 16 and the top piece 18. Such exemplary material would reflect a certain amount of radiation and allow smaller amounts or radiation to pass through. It is to be noted that the desired protection for the popped corn, that of keeping it from burning, is only preferentially necessary during the completion of the popping process and for some short time thereafter until the exemplary popper 100 is removed from the microwave oven. It is therefore not necessary to provide absolute protection to the popped corn, but only limited protection and the exemplary illustrative materials listed above show various and varying degrees of microwave protection.

The exemplary popper 100 as best seen in FIG. 1 and in schematic in FIG. 4, would preferably have the walls of the essentially opaque section 13 taper inwards to aid in allowing the popped corn to fall inwards and prevent the popped corn from blocking the openings 14 or 14' of the essentially microwave opaque section 13.

As seen in FIG. 1, an exemplary preferred means 11 for holding the popcorn to be popped includes a preferential microwave transparent surface 28 established at an angle such as an exemplary 8.7 degrees to the horizontal plane 58 of the popper 100. The exemplary surface 28 forming essentially a cone shape for causing the popped corn to fall down the inclined plane of the cone. There is also included a preferential microwave transparent retainer means 29 for retaining the unpopped corn on the surface 28 of the means 11 until the corn is popped. The retainer means 29 formed essentially perpendicular to the radii of the cone shape. The exemplary retainer means 29 having an exemplary height of 3/16" and preferably no higher than an unpopped kernel of corn as not to interfere with the popped corn and cause the popped corn to be retained by the surface of the popping means 11 after popping, instead allowing the popped corn due to its kinetic energy derived from popping to tumble down the incline of the exemplary surface 28, through the openings 14 (14') and into the essentially opaque section 13 below, there to be retained and prevented from burning until the popping of the corn is finished and the popper 100 is removed from the microwave oven. The exemplary cone has an exemplary height on the order of ½ inch above the base of the cone and an exemplary base width of the order of 6½ inches although other heights and base widths are also contemplated and within the scope of the inventive concept herein disclosed. The base of the means 11 should be separated from the essentially microwave top piece 18 by a distance such as an exemplary distance of 1 inch.

The first preferential exemplary retainer means 29 as shown in FIGS. 1 and 2 are formed circumferential around the surface 28 of the cone. This exemplary embodiment of the retainer means 29 allows the corn and an amount of popping oil as desired by the user (or no oil as desired by the user) to be retained on the surface 28 of the popping means 29. A second exemplary retainer means, unillustrated, 29 has the retainer means formed in a loose spiral around the inclined surface 28 of the cone. The spiral is preferably formed loose enough that the force of friction overcomes the desire of the unpopped corn to roll down the spiraled incline and causes the popcorn to remain in place until popped.

Figure 5:
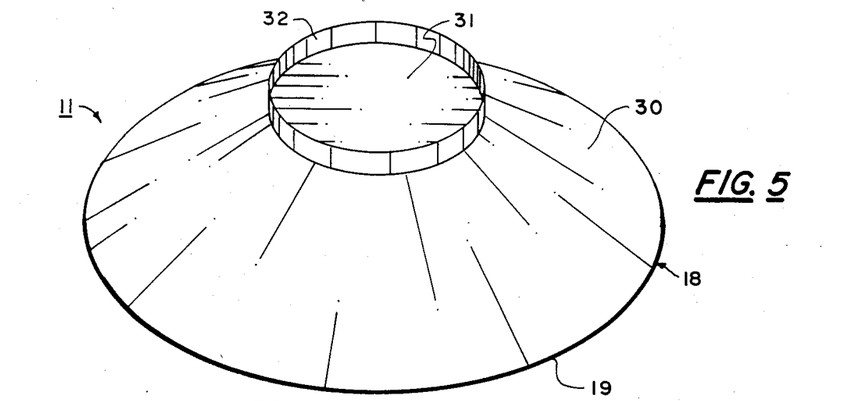
FIG. 5 is a perspective view of a second exemplary embodiment of the means 11 for holding the popcorn to be popped of the exemplary popper 100 of FIG. 1.

In FIG. 5, a second preferential exemplary means 11 for holding the popcorn to be popped includes a preferential microwave transparent surface 30 established at an angle to the horizontal plane 58 of the popper 100. The exemplary surface 30 forming essentially a cone having an exemplary slope of 45 degrees for urging the popped corn to fall down the inclined plane of the cone. The second exemplary means 11 also includes a preferential microwave transparent popping dish 31 located at the top of the cone. The exemplary popping dish 31 having a preferential microwave transparent edge 32 for retaining the unpopped corn in the dish until the corn is popped. This second exemplary means 11 also allowing for the corn to be popped without popping oil or with popping oil as desired by the user. The exemplary popping dish 31 is formed small enough that the dish 31 does not retain the popped corn and interfere with its falling to the essentially opaque section 13 located below the popping means 11. Exemplary measurements for the dish are a diameter of 4 inches and an edge height of ¼ inch, and with the exemplary slope of 45 degrees there exists an exemplary 1⅛ inch separation between the top piece 18 and the base of the popping dish 31. The exemplary base width for the cone is on the order of 6½ inches, although other slopes, base widths, and diameters are also contemplated and within the scope of the inventive concept herein disclosed. A third exemplary unillustrated means 11 would have the popping disk shaped as an upwards opening cone and located in the top of the inverted cone 30, again the cones are formed of a preferentially microwave transparent material.

As seen in FIG. 1, a preferred exemplary embodiment of the containment means 12 of the popping section 10 includes an exemplary inverted spreader cone 33 for urging and aiding the popcorn as it pops to fall down the exemplary inclined surfaces 28 or 30 of the cone and enter the exemplary opening 14 or 14' of the essentially microwave opaque section 13 and prevent the popped corn from burning. The exemplary spreader cone 33 aiding in preventing the popped corn from falling back and remaining on the exemplary means 11 for holding the popcorn to be popped. The containment means 12, as illustrated, should preferably be removable and separate from the popping means 11.

Figure 6:
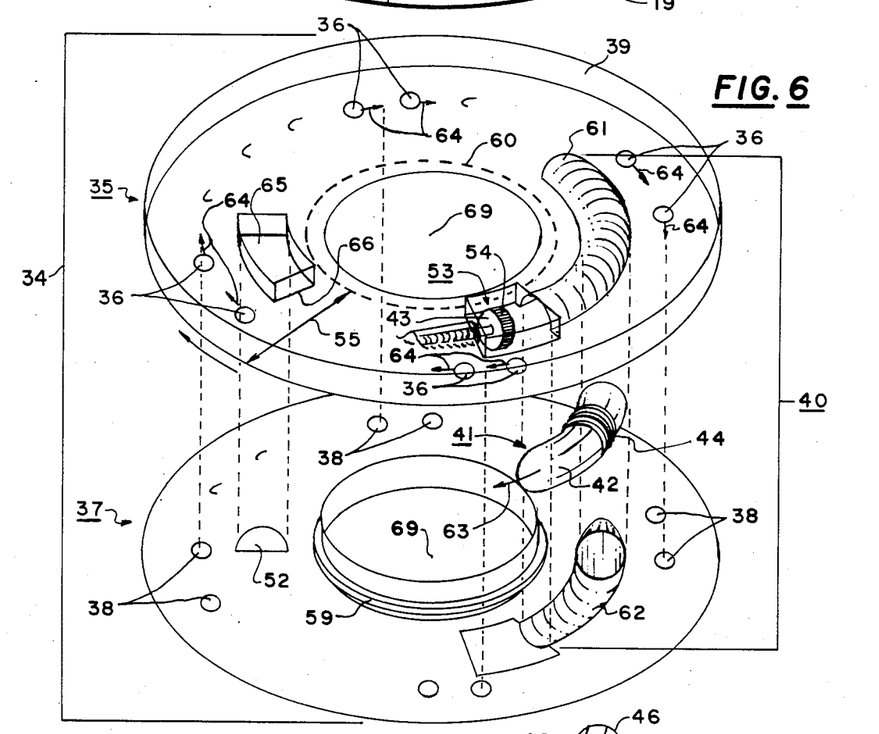
FIG. 6 is an exploded perspective view of a preferred exemplary buttering device for supplying melted butter to the popped corn of a popper such as the exemplary preferred popper of FIG. 1. The preferred exemplary buttering device is located in the transparent to microwaves popping section of the exemplary popper of FIG. 1 and supplies the melted butter or margarine to the popped corn through openings in the essentially microwave opaque section 13 after a user adjustable time delay.

In FIG. 6, a preferred embodiment of an exemplary automatic buttering device for supplying melted butter to the popped corn and which is located preferably in the essentially preferable transparent popping section 10 of the popper 100 is shown in exploded view. The exemplary buttering device 34 comprises an exemplary first member 35, preferably disk shaped and flat, having a plurality of openings 36 on which the butter to be melted by the microwaves is placed; and an exemplary second member 37, also correspondingly disk shaped and flat, located below the first member 35 and having a corresponding plurality of openings 38 corresponding to the openings 36 of the first member 35. The exemplary second member 37 is rotatively attached to the first member 35 and located under the first member 35 with the openings 38 of the second member 38 out of juxtaposition with the openings 36 of the first member 35. The members 35 and 37 can be as exemplary attached by having a snap lip 59 formed preferentially on the lower member 37 which snaps into the opening of the first member 35 and allows the members 35 and 37 to rotate, as well as allows for the user to readily separate the members and allow for easy cleaning. The exemplary first member 35 should preferably include an edge 39 for retaining the melted butter within the exemplary buttering device 34 and include a second edge located for example at dashed line 60 or have the exemplary snap lip 59 of sufficient height to prevent the melted butter from flowing over its edge; the edge 39 and an edge located for example at 60 or lip 59 only allowing the melted butter to flow out of the openings 36 when they are in juxtaposition with the corresponding openings 38 of the second member 37. The exemplary buttering device 34 also comprising a means 40 exemplary located and held between exemplary opposed circumferential raised areas 61 and 62 for causing the first member 35 and the second member 37 to rotate and cause the juxtaposition of the openings 36 of the first member 35 and the second member 37, allowing the melted butter to flow through the juxtaposed openings 36 and 38 and onto the popped corn, the exemplary means 40 for causing the first member 35 and the second member 38 to rotate and juxtapose openings 36 and 38 including an exemplary corresponding circumferential shaped time delay means 41 to allow the melted butter to flow through the juxtaposed openings 36 and 38 of the first and second members 35 and 37 and onto the popped corn.

As seen in FIG. 6, an exemplary preferred means 40 for causing the first member 35 and the rotatively attached second member 37 to rotate comprises a timing means having an illustrated first exemplary preferred time delay means 41 which is shaped as an exemplary corresponding circumferential shaped expandable cylinder 42 and is located for expansion in the exemplary opposed circumferential raised areas 61 and 62 of members 35 and 37. The cylinder 42 is closed on both ends, and an exemplary substance such as water which interacts with the microwaves produced by the microwave oven is located in the hollow of the cylinder 42. The interaction of the substance and the microwaves produced by the microwave oven producing a pressure change or increase within the closed expandable cylinder 42, causing the cylinder 42 to expand its length, as indicated by arrow 63. The timed expansion of the exemplary substance and the corresponding expansion of the time delay means 41 causing the cylinder 42 to push on the face 54' of the thumb screw 53 and cause the rotation of the first and second members 35 and 37 as indicated by arrows 64 to juxtapose the openings 36 and 38 and allow the melted butter to flow from the juxtaposed openings 36 and 38 of the buttering device 34 and onto the popped corn.

As seen in FIG. 6, the exemplary preferential expandable cylinder 42 of the first time delay means 41 includes an expandable accordion section 44 for allowing the cylinder 42 to expand in a lengthwise direction as indicated by arrow 63. This exemplary first time delay means 41 should preferentially include an exemplary means such as a stop 52 which moves in an exemplary opening 65 until it contacts edge 66 and causes members 35 and 37 to stop rotating and maintain the juxtaposition of the openings 36 and 38, allowing the melted butter to flow from the juxtaposed openings 36 and 38 and onto the popped corn.

Figure 7:
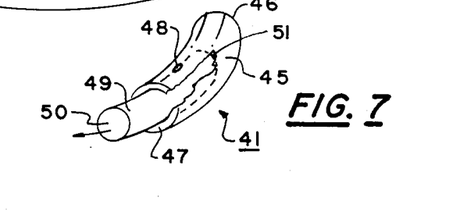
FIG. 7 is a perspective view of a second preferred time delay means 41 of the exemplary buttering device of FIG. 6 shown partially cut away.

In FIG. 7, an exemplary preferred means 40 for causing the first member 35 and the rotatively attached second member 37 to rotate comprises timing means having an illustrated second exemplary preferred second time delay means 41 for causing the first member 35 and the rotatively attached second member 37 to rotate is seen. The exemplary preferred second time delay means 41 comprises a correspondingly circumferential shaped cylinder 45 closed on one end 46 and open on its other end 47 and is located in the exemplary opposed circumferential raised areas 61 and 62 of members 35 and 37. The cylinder 45 includes an opening 48 in the walls of the cylinder a distance along the length from the closed end 46 of the cylinder, and the time delay means 41 also includes an exemplary piston 49 located in the hollow 51 of the cylinder. The exemplary piston 49 has an end portion 50 correspondingly circumferential in shape which extends from the open end 47 of the cylinder. Located in the enclosed hollow 51 of the cylinder 45 formed by the walls of the cylinder 45, the closed end 46 of the cylinder 45, and the piston 49 is an exemplary substance such as water which interacts with the microwaves produced by the microwave oven. The timed expansion of the substance which interacts with increasing time with the microwaves produced by the microwave oven causing the pressure in the enclosed hollow 51 of the cylinder 45 to rise due to the pressure change inside the length of the enclosed hollow of the cylinder 45 and causing a corresponding movement of the piston 49 in the hollow due to the pressure change within the enclosed hollow 51. The exemplary piston 49 moving along the length of the cylinder 45 pushing on the face 54' of the thumb screw 53 and causing members 35 and 37 to rotate. When piston 49 essentially passes opening 48 in the cylinder walls, the pressure enclosed in the enclosed hollow 51 of the cylinder 45 is released and the exemplary piston 49 stops moving due to the equalization of pressure. The exemplary time expansion of the substance and the corresponding expansion of the time delay means 41 causing the rotation of the first and second members 35 and 37, and as the piston 49 essentially passes the opening 48 in the cylinder walls and stops, the openings 36 and 38 are juxtaposed, allowing the melted butter to flow from the juxtaposed openings 36 and 38 of the buttering device 34 and onto the popped corn.

Figure 8:
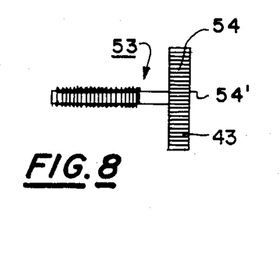
FIG. 8 is a side view of the thumb screw 53 of the buttering device of FIG. 6.

The exemplary preferred timing means 41 should also preferably include an exemplary manually adjusting means 43 as seen in FIGS. 6 and 8 for allowing selective delay times as the exemplary time delay means 41 causes the first member 35 and the second member 37 to rotate, causing the juxtaposition of openings 36 and 38 of the first and second members 35 and 37, and allowing the melted butter to flow through the juxtaposed openings 36 and 38 of the first and second members 35 and 37 and onto the popped corn when desired. An exemplary illustrated preferred embodiment of the adjusting means 43 comprises a thumb screw 53 which includes a preferential large head 54 for easy turning and has a bearing face 54' which the timing means 41 bears against and pushes on as the timing means 41 expands. The shaft of the exemplary adjusting means 43 is exemplary threaded to allow the selective positioning of the head 54 and the corresponding bearing face 54' of the screw 53. The turning of the screw 53 causing the screw 53 to move forwards or backwards to aid in timing the juxtaposition of the openings 36 and 38. It is also contemplated that the shaft could be slidably fixed for adjusting the location of the head 54 and the corresponding bearing face 54' of the screw 53 as an alternate embodiment of this exemplary embodiment. The exemplary preferred screw 53 should be made preferentially of a microwave transparent material such as plastic. The timing means and in particular the timing means combined with the adjusting means 43 allows the user to best control the supply of melted butter, allowing the melted butter to be delivered to a substantial amount of popped corn, and not prematurely to an empty container or a container containing only very small amounts of popped corn.

The exemplary preferred buttering device 34 should be located preferentially either above the essentially opaque top piece 18 and at some distance above the piece 18. The piece 18 should also have holes corresponding to the holes 36 and 38 and connected by some means such as exemplary preferentially microwave transparent tubes or funnel shaped connections to these openings 36 and 38, allowing the melted butter from the buttering device 34 to fall onto the popped corn contained in the essentially microwave opaque section 13 located below. A second preferred illustrated embodiment of the buttering device would have the openings 36 and 38 in juxtaposition with openings 14 or 14' as indicated by arrow 55 (corresponding to width 55 in FIG. 2) in FIG. 6, allowing the melted butter as it flows through juxtaposed openings 36 and 38 to fall through the juxtaposed larger openings 14 or 14' and onto the popped corn located below in the essentially microwave opaque section 13. With this embodiment, member 37 would preferably be attached to the walls 67 (as indicated by exemplary dashed line 68) of the containment means 12 (see FIG. 1) and the lid 12' to the containment means 12 would be removable to allow easy access to the buttering device 34. The openings 69 in members 35 and 37 should be of a sufficient diameter to allow the inverted spreader cone 33 to pass through the members 35 and 37.

It is within the scope of the inventive concepts herein taught that coatings such as Teflon could be employed on the means 11 for holding the popcorn to be popped and on the interior of the essentially microwave opaque section 13 and that these type of coatings could be used as desired in the embodiments to prevent sticking and aid in easy clean up after use. In the event that microwave transparent soda-lime glass is used for container construction, in particular in an embodiment of the clear containment means 12, then for microwave heating the soda-lime glass would preferably have a stress layer as is known to those skilled in the art suitable for microwave oven use on the outer surface of the article to increase its thermal shock value.

The exemplary preferred buttering device 34 as disclosed and other varying embodiments within the scope of the inventive concepts of buttering devices 34 herein taught are conceived as usable with other embodiments of microwave popcorn poppers other than the disclosed preferential embodiment and it is to be understood that this is contemplated and within the scope of the invention and that the details herein concerning the inventive concept of the exemplary buttering devices are to be interpreted as illustrative and not in a limiting sense.

Because may varying and different embodiments may be made within the scope of the inventive concept herein taught, and because may modifications may be made in the embodiment(s) herein detailed in accordance with the descriptive requirements of the law, it is to be understood that the details herein are to be interpreted as illustrative and not in a limiting sense.

What is claimed is:

1. A popcorn popper for popping corn kernels in a microwave oven or the like having a cavity therein and producing a source of microwave energy, comprising:
    (a) a popping section transparent to microwaves for popping the corn, said popping section having:
        (1) means for holding an amount of unpopped corn to be popped, such that an amount of unpopped corn placed thereon is caused to be popped by the microwave energy and become an amount of popped corn, and
        (2) containment means located around said means for holding an amount of unpopped corn to be popped, said containment means preventing the popped corn as it pops from leaving said means for holding and falling into the cavity of the microwave oven;
    (b) an at least partially microwave opaque section attached to said popping section and having at least one opening in open communication with said means for holding for receiving the popped corn, said opaque section storing the popped corn and providing means for restraining the popped corn from burning as the unpopped corn continues to pop, said opaque section allowing the unmonitored popping of the corn; and
    (c) means cooperative between said means for holding and said opening for urging said popped corn into said opening and into said opaque section.

2. The popper of claim 1, wherein said means cooperative between said means for holding and said opening includes:
    (a) a surface established at an angle to the horizontal plane, said surface forming essentially a cone having its base facing downwards and its vertex located at the apex for causing the popped corn to fall down and off the inclined plane of the cone; and
    (b) retainer means for retaining said unpopped corn on said surface until said corn is popped, said retainer means being essentially perpendicular to the radii of said cone.

3. The popper of claim 1, wherein said containment means has an inverted spreader cone for urging and aiding the popcorn as it pops to enter said opening of said at least partially microwave opaque section and prevent the popped corn from burning, said spreader cone aiding in preventing the popped corn from falling back and remaining on said means for holding the popcorn to be popped.

4. The popper of claim 1, wherein said at least partially microwave opaque section includes:
    (a) an at least partially opaque bowl shaped section having an edge extending around said bowl section for holding the popped corn; and
    (b) an at least partially opaque top piece positioned above and located in said edge of said bowl shaped section, said top piece and said bowl shaped section having at least one opening into said bowl shaped section to allow the popped corn to enter.

5. The popper of claim 4, wherein said at least partially opaque top piece is formed with a pattern that reflects the microwaves in a random manner.

6. The popper of claim 1, wherein said means cooperative between said means for holding and said opening includes:
   (a) a surface established at an angle to the horizontal plane, said surface forming essentially a conical surface having its circular perimeter located at its base facing downward and the line segments defining the conical surface that join every point of the boundary of the circular perimeter extending upwards to a circular vertex positioned at the apex for urging the popped corn to fall down and off the inclined plane of the conical surface; and
   (b) a popping dish located at the vertex of said conical surface, said dish having an edge for retaining said unpopped corn in said dish until said corn is popped.

7. The popper of claim 1, wherein said opaque section has a peripheral edge which defines in part, said opening, and wherein there is also included in said popper a second peripheral edge, which further defines said opening, and wherein said popper further includes at least one at least partially microwave opaque rib extending between said first and said second peripheral edges which further defines said opening.

8. A popcorn popper for popping corn kernels in a microwave oven or the like having a cavity therein and producing a source of microwave energy, comprising:
   (a) a popping section transparent to microwaves for popping the corn, said popping section having:
   means for holding an amount of unpopped corn to be popped, such that an amount of unpopped corn placed thereon is caused to be popped by the microwave energy and become an amount of popped corn, and
   containment means located around said means for holding an amount of unpopped corn to be popped, said containment means preventing the popped corn as it pops from leaving said means for holding and falling into the cavity of the microwave oven;
   (b) an at least partially microwave opaque section attached to said popping section and having at least one opening for receiving the popped corn, said opaque section for storing the popped corn and preventing said corn from burning as the unpopped corn continues to pop, said opaque section allowing the unmonitored popping of the corn;
   (c) a member on which an amount of butter to be melted is placed, said member retaining the butter to be melted by the microwave energy;
   (d) a plurality of closed openings located in said member, the opening of said openings delivering an amount of melted butter to the popped corn; and
   (e) timing means for causing the opening of said closed openings and allow the melted butter to flow through said openings and onto the popped corn, said timing means including time delay means to prevent said timing means from prematurely opening said openings, said time delay means causing said timing means to delay the opening of said openings and time the opening of said openings and the corresponding flow of the melted butter through said openings and onto the popped corn, said time delay means causing said openings to delay their opening and to deliver the melted butter to a substantial amount of popped corn.

9. The popper of claim 8, wherein said member comprises:
   (a) a first member having a plurality of openings on which the butter to be melted by the microwave energy is placed; and
   (b) a second member located below said first member and having a plurality of openings corresponding to the openings of said first member, said second member being rotatively attached to said first member and located under said first member with said openings of said second member out of juxtaposition with the openings of said first member; and
   wherein there is further included
   means for causing said first member and said second member to rotate and cause the juxtaposition of the openings of said first member and said second member, allowing the melted butter to flow through said openings and onto said popped corn, said means for causing said first member and said second member to rotate including said time delay means to allow said melted butter to flow through said juxtaposed openings of said first and second members and onto the popped corn.

10. The popper of claim 9, wherein said time delay means of said means for causing said first member and said second member to rotate, comprises:
    (a) an expandable cylinder closed on both ends; and
    (b) a substance which interacts with the microwaves produced by the microwave oven located in the hollow of said cylinder, the interaction of said substance and the microwaves causing said cylinder to expand its length;
    the timed expansion of said substance and the corresponding expansion of said time delay means causing the melted butter to flow from the juxtaposed openings of said buttering device and onto the popped corn.

11. The popper of claim 10, wherein said expandable cylinder includes an expandable accordion section.

12. The popper of claim 9, wherein said time delay means of said means for causing said first member and said second member to rotate, comprises:
    (a) a cylinder closed on one end and open on its other end, said cylinder including an opening in the walls of said cylinder a distance along the length from the closed end of said cylinder;
    (b) a piston having an end portion which extends from said open end of said cylinder located in the hollow of said cylinder; and
    (c) a substance which interacts with the microwave energy located in the enclosed hollow of said cylinder formed between the walls of said cylinder, said closed end of said cylinder, and said piston, the timed expansion of said substance which interacts with the microwave energy produced by the microwave oven causing a pressure increase in said enclosed hollow of said cylinder and causing the movement of said piston due to the pressure increase, said piston moving along the length of said cylinder and past said opening in said cylinder walls, releasing the pressure increase and causing said piston to stop moving due to the equalization of pressure;
    the timed expansion of said substance and the corresponding expansion of said time delay means causing the melted butter to flow from the juxtaposed openings of said buttering device and onto the popped corn.

13. The popper of claim 8, wherein said time delay means further includes adjusting means for allowing selective delay times for causing said timing means for causing the opening of said closed openings and allow the melted butter to flow through said openings and onto the popped corn to open said openings and allow the melted butter to flow through said openings and onto the popped corn when desired.

14. The popper of claim 8, wherein said containment means has an inverted spreader cone for urging and aiding the popcorn as it pops to enter said opening of said at least partially microwave opaque section and prevent the popped corn from burning, said spreader cone aiding in preventing the popped corn from falling back and remaining on said means for holding the popcorn to be popped.

15. An automatic buttering device for use with a microwave popcorn popper or the like in a microwave oven or the like having a cavity therein and producing a source of microwave energy, comprising:
 (a) a member on which an amount of butter to be melted is placed, said member retaining the butter to be melted by the microwave energy;
 (b) a plurality of closed openings located in said member, the opening of said openings delivering an amount of melted butter to an amount of popped corn contained in the popper; and
 (c) timing means containing a substance therein capable of being actuated upon by the microwave energy for causing the opening of said closed openings and allow the melted butter to flow through said openings and onto the popped corn, said timing means including time delay means to prevent said timing means from prematurely opening said openings, said time delay means causing said timing means to delay the opening of said openings and time the opening of said openings and the corresponding flow of the melted butter through said openings and onto the popped corn, said time delay means causing said openings to delay their opening and to deliver the melted butter to a substantial amount of popped corn.

16. The buttering device of claim 15, wherein said buttering device further includes:
 (a) a first member having a plurality of openings on which the butter to be melted by the microwave energy is placed;
 (b) a second member located below said first member and having a plurality of openings corresponding to the openings of said first member, said second member being rotatively attached to said first member and located under said first member with said openings of said second member out of juxtaposition with the openings of said first member; and
 (c) means for causing said first member and said second member to rotate and cause the juxtaposition of the openings of said first member and said second member, allowing the melted butter to flow through said openings and onto said popped corn, said means for causing said first member and said second member to rotate including time delay means to allow said melted butter to flow through said juxtaposed openings of said first and second members and onto the popped corn.

17. An automatic buttering device for use with a microwave popcorn popper or the like in a microwave oven or the like having a cavity therein and producing a source of microwave energy, comprising:
 (a) a member on which an amount of butter to be melted is placed, said member retaining the butter to be melted by the microwave energy;
 (b) a plurality of closed openings located in said member, the opening of said openings delivering an amount of melted butter to an amount of popped corn contained in the popper; and
 (c) timing means containing a substance therein capable of being actuated upon by the microwave energy for causing the opening of said closed openings and allow the melted butter to flow through said openings and onto the popped corn, said timing means including time delay means to prevent said timing means from prematurely opening said openings, said time delay means causing said timing means to delay the opening of said openings and time the opening of said openings and the corresponding flow of the melted butter through said opoenings and onto the popped corn, said time delay means causing said openings to delay their opening and to deliver the melted butter to a substantial amount of popped corn; and
wherein said time delay means, comprises:
 (a) an expandable cylinder closed on both ends; and
 (b) a substance which interacts with the microwave energy produced by the microwave oven located in the hollow of said cylinder, the interaction of said substance and the microwave energy causing said cylinder to expand its length;
the timed expansion of said substance and the corresponding expansion of said time delay means causing the melted butter to flow from the juxtaposed openings of said buttering device and onto the popped corn.

18. The buttering device of claim 16, wherein said time delay means, comprises:
 (a) a hollow cylinder closed on one end and open on its other end, said cylinder including an opening in the walls of said cylinder a distance along the length from the closed end of said cylinder;
 (b) a piston having an end portion which extends from said open end of said cylinder located in the hollow of said cylinder; and
 (c) a substance which interacts with the microwave energy located in an enclosed hollow formed between the inside walls of said cylinder, said closed end of said cylinder, and said piston, the timed expansion of said substance causing the pressure in said enclosed hollow of said cylinder to rise and causing the movement of said piston due to the pressure change within said enclosed hollow, said piston moving along the length of said cylinder and past said opening in said cylinder walls, releasing the pressure enclosed in said enclosed hollow and causing said piston to stop moving due to the equalization of pressure;
the timed expansion of said substance and the corresponding expansion of said time delay means causing the melted butter to flow from the juxtaposed openings of said buttering device and onto the popped corn.

19. The buttering device of claim 15, wherein said time delay means further includes adjusting means for allowing selective delay times so that the opening of said closed openings is further controlled.

20. A method of popping corn kernels in a microwave oven or the like having a cavity therein and producing a form of microwave energy, comprising the steps of:
(a) placing an amount of unpopped corn in a microwave transparent means for popping the corn;
(b) popping the unpopped corn with the microwave energy so that an amount of popped kernels of corn is produced from the unpopped corn;
(c) having the popped kernels of corn in open communication with an opening in an at least partially microwave opaque section;
(d) urging the popped kernels of corn into the opening and into the at least partially microwave opaque section;
(e) retaining the popped kernels of corn in the at least partially microwave opaque section; and
(f) restraining the popped corn in the at least partially microwave opaque section from interacting with the microwave energy and burning until the popping process is finished.

21. A popcorn popper for popping corn kernels in a microwave oven or the like having a cavity therein and producing a source of microwave energy, comprising:
a popping section transparent to microwave energy for popping the corn, said popping section having:
means for holding an amount of unpopped corn to be popped, such that an amount of unpopped corn placed thereon is caused to be popped by the microwave energy and become an amount of popped corn, and
containment means disposed around said means for holding an amount of unpopped corn to be popped, said containment means preventing the popped corn as it pops from leaving said means for holding and falling into the cavity of the microwave oven;
an at least partially microwave opaque section attached to said popping section and having at least one opening in open communication with said means for holding for receiving the popped corn, said opaque section storing the popped corn and restraining the popped corn from burning as the unpopped corn continues to pop; and
flavoring means associated with said popcorn popper for supplying an amount of liquid flavoring at the end of a time delay period, said flavoring means having
a means for retaining said liquid flavoring, and
a timing means associated with said flavoring means for providing said time delay period, said means for retaining said flavoring being responsive to said timing means such that said flavoring is caused to flow from said means responsive to the end of said time delay period.

22. Apparatus for use in a microwave oven or the like that produces a source of microwave energy, comprising:
a member;
at least one closed opening located in said member, the opening of said opening allowing a liquid to flow from said opening; and
timing means containing a substance therein directly capable of being actuated by the microwave energy thereon for causing a pressure in said timing means, said pressure for the opening of said closed opening to allow the liquid to flow through said opening, said timing means including means operable in response to said pressure in said timing means when said substance is actuated upon by the microwave energy to open said opening and time delay means to delay the opening of said opening and the corresponding flow of liquid from said opening.

23. Apparatus for use in a microwave oven having a cavity therein and a means for introducing microwave energy into the cavity, comprising:
means for restraining the burning of an amount of popped corn by the microwave energy, said means for restraining including a generally hollow, at least partially microwave opaque section defining a cavity with one open side;
microwave transparent means for holding an amount of unpopped corn to be popped, said microwave transparent means disposed above said means for restraining such that an amount of unpopped corn placed thereon is caused to be popped by the microwave energy and become an amount of popped corn;
an at least partially microwave opaque top piece disposed under said means for holding to provide means to reflect the microwave energy from said means for restraining onto said means for holding an amount of unpopped corn to aid in popping of the unpopped corn, said top piece included in said means for restraining and disposed in said open side of said opaque section with the edges of said top piece and said opaque section defining an opening therein into said means for restraining, with said opening therein in open communication with said means for holding;
microwave transparent containment means, said containment means being generally hollow and defining a cavity with one open side, said open side of said containment means oriented on said means for restraining with said means for holding disposed in said cavity of said containment means and said cavity of said containment means in communication with said opening, said containment means preventing the popped corn as it pops from falling into the cavity of the microwave oven; and
means cooperative between said means for holding and said opening for urging said popped corn into said opening and into said means for restraining the burning of the popped corn.

24. The apparatus of claim 23, wherein said means cooperative between said means for holding and said opening includes a member established at an angle to the horizontal plane for urging the popped corn to fall from said means for holding and into said opening.

25. The popper of claim 23, wherein there is further included at least one at least partially microwave opaque rib extending between the edges of said opaque section and said top piece which further defines said opening.

26. Apparatus for use in a microwave oven or the like that produces a source of microwave energy, comprising:
a member;
at least one closed opening located in said member, the opening of said opening allowing a liquid to flow from said opening; and
timing means containing a substance therein directly capable of being actuated by the microwave energy thereon for causing a pressure in said timing means, said pressure for the opening of said closed opening to allow the liquid to flow through said opening, said timing means including means operable in response to said pressure in said timing means when said substance is actuated upon by the microwave energy to open said opening and time delay means responsive to the microwave energy to delay the opening of said opening and the corresponding flow of liquid from said opening.

27. A method of popping popcorn in a microwave oven or the like having a cavity therein and producing a source of microwave energy, comprising the steps of:
   (a) placing an amount of unpopped corn in a microwave transparent means for popping the corn;
   (b) popping the unpopped corn with the microwave energy so that an amount of popped kernels of corn is produced from the unpopped corn;
   (c) having the popped kernels of corn in open communication with an opening in an at least partially microwave opaque section;
   (d) urging the popped kernels of corn into the opening and into the at least partially microwave opaque section;
   (e) retaining the popped kernels of corn in the at least partially microwave opaque section;
   (f) restraining the popped corn in the at least partially microwave opaque section from interacting with the microwave energy and burning until the popping process is finished;
   (g) opening a closed opening in a member disposed on the popper with a timing means having a time delay means so that the opening of the closed opening is delayed; and
   (h) having a liquid flow from the opening in the member and onto the popped corn.

* * * * *